United States Patent [19]

Nakashima et al.

[11] Patent Number: 4,706,001
[45] Date of Patent: Nov. 10, 1987

[54] INDUSTRIAL ROBOT

[75] Inventors: Seiichiro Nakashima; Kenichi Toyoda, both of Hino; Nobutoshi Torii, Hachioji, all of Japan

[73] Assignee: Fanuc Ltd., Yamanashi, Japan

[21] Appl. No.: 845,276

[22] PCT Filed: Jul. 4, 1985

[86] PCT No.: PCT/JP85/00378

§ 371 Date: Mar. 3, 1986

§ 102(e) Date: Mar. 3, 1986

[87] PCT Pub. No.: WO86/00558

PCT Pub. Date: Jan. 30, 1986

[30] Foreign Application Priority Data

Jul. 4, 1984 [JP] Japan .................................. 59-137293

[51] Int. Cl.$^4$ .............................................. G05B 19/10
[52] U.S. Cl. .................................... 318/568; 318/565; 901/49; 901/50
[58] Field of Search .............. 318/568, 568 D, 568 H, 318/565; 901/30, 34, 9, 10, 22, 46, 49, 50, 40, 43; 364/167, 184, 513, 558; 310/87, 88

[56] References Cited

U.S. PATENT DOCUMENTS

| 3,952,759 | 4/1976 | Ottenstein | 364/558 |
| 4,149,935 | 4/1979 | Fields | 901/49 |
| 4,311,556 | 1/1982 | Iwamoto | 901/46 |
| 4,398,233 | 8/1983 | Bala | 901/49 |
| 4,575,610 | 3/1986 | Gavin | 219/121 L |
| 4,587,619 | 5/1986 | Converse | 364/558 |

FOREIGN PATENT DOCUMENTS 2038772 7/1980 United Kingdom .................. 901/49

Primary Examiner—William M. Shoop, Jr.
Assistant Examiner—Patrick C. Keane
Attorney, Agent, or Firm—Armstrong, Nikaido, Marmelstein & Kubovcik

[57] ABSTRACT

The robot assembly of an industrial robot comprises a stationary robot component (11) and a plurality of movable robot components (12, 13, 14). At least parts of the stationary robot component and the movable robot components have airtight chambers (15, 16, 17) communicating with each other and intended to be kept at a pressure higher than a predetermined level which is higher than an external atmospheric pressure. Robot driving motors (18 to 23) for driving the movable robot components are arranged within the airtight chambers. A driving motor controller (27) for driving and controlling the robot driving motors is connected to the robot driving motors by means of electric cables arranged within the airtight chambers. Pressure switches (25) supply signals to the driving motor controller to stop the robot driving motors, respectively, upon detection of the pressure in the airtight chambers when the pressure in the airtight chambers drops below the predetermined level.

6 Claims, 7 Drawing Figures

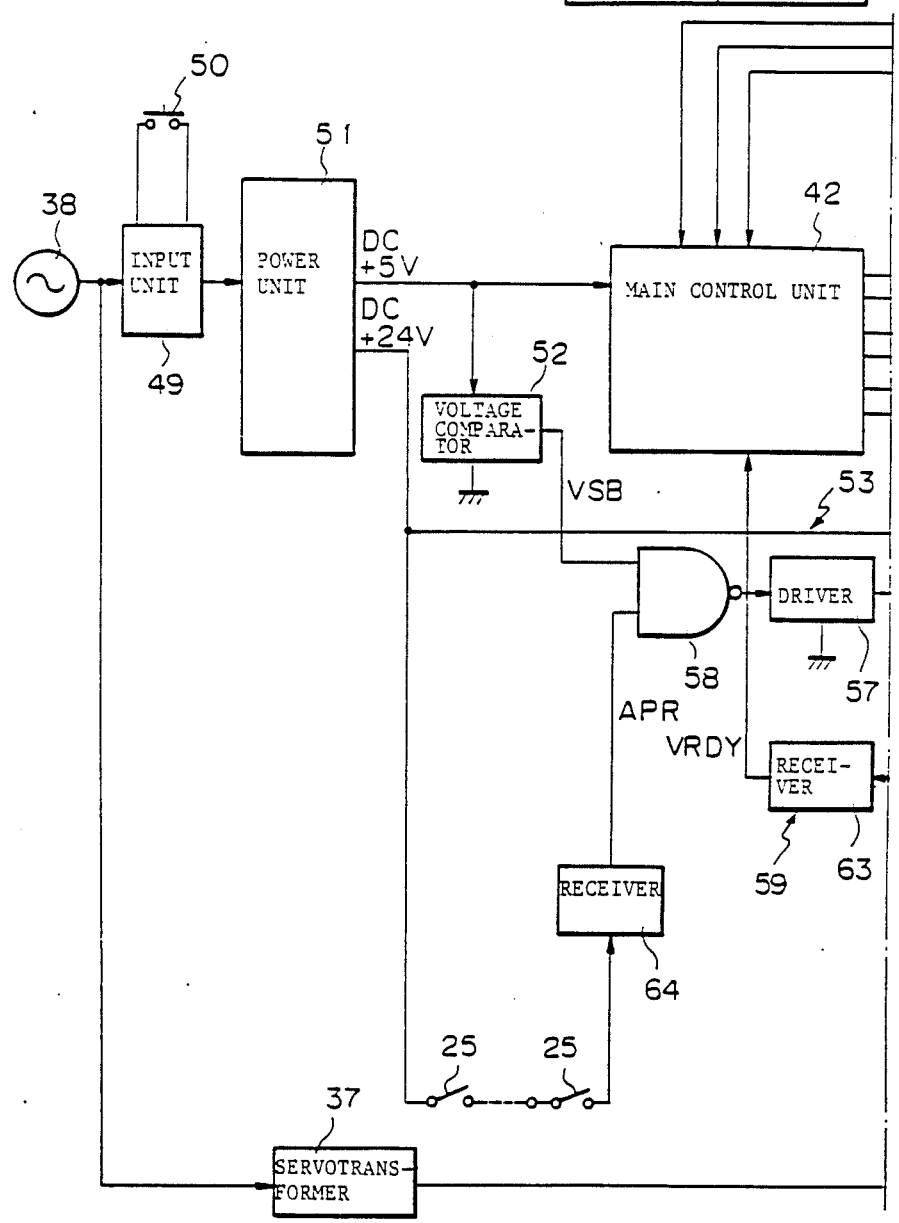

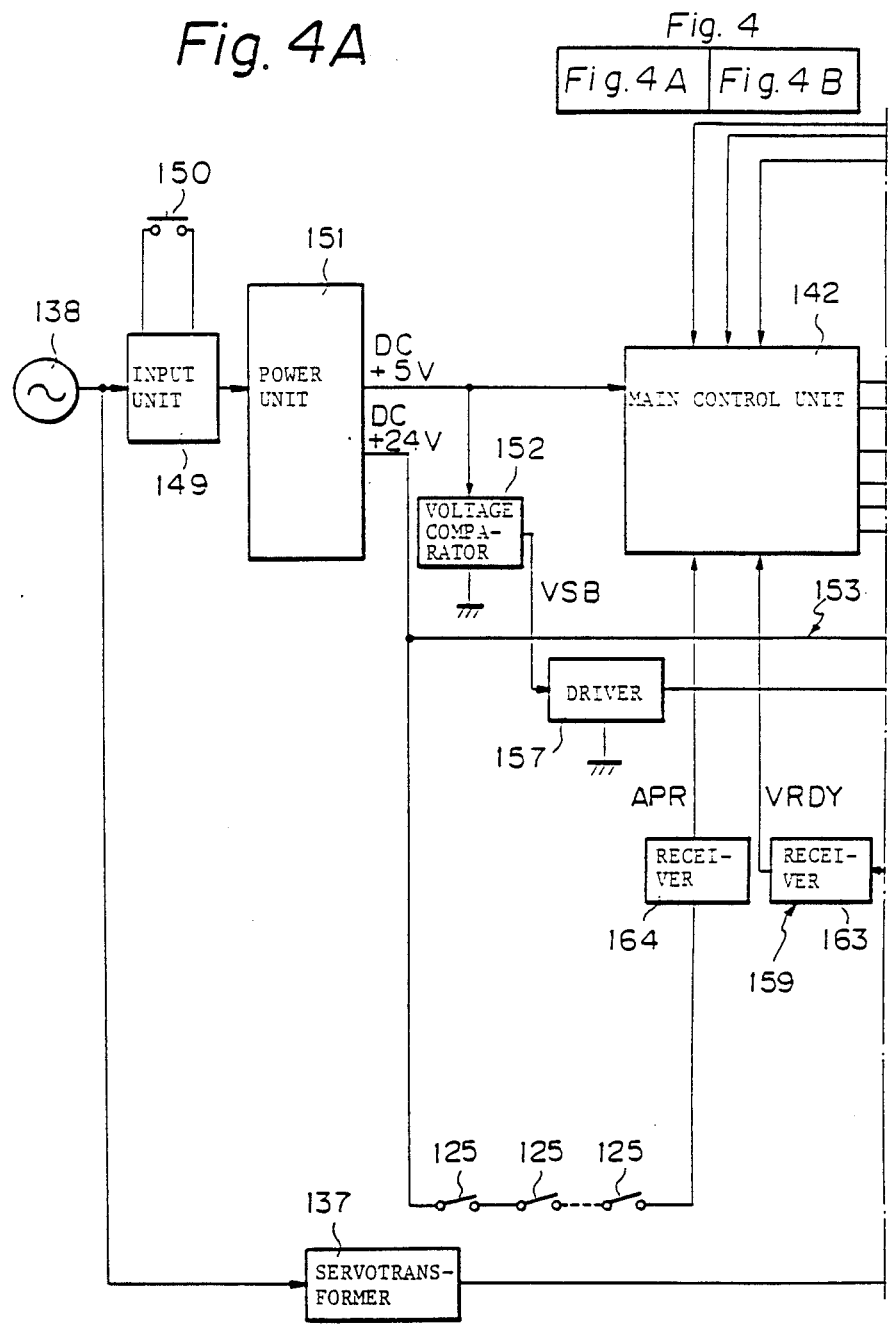

INDUSTRIAL ROBOT

DESCRIPTION

1. Technical Field

The present invention relates to an industrial robot and, more particularly, to an industrial robot suitable for operation of the robot in an inflammable or explosive environment.

2. Background Art

Generally, the industrial robot is provided with drive motors which are attached on the outer wall of the robot components. Electric cables connected to the corresponding drive motors are also arranged outside the robot. Accordingly, it has been dangerous to use such a robot in an inflammable or explosive environment.

Japanese Patent Application No. 59-133002 by the present applicant discloses an industrial robot having an internally pressurized explosion proof structure for use in an inflammable or explosive environment. The robot comprises robot components such as a stationary base unit, a swiveling body unit, robot arms or the like. Motors for driving movable components of the robot and electric cables connected to the motors are respectively arranged within an airtight chamber formed in the robot, and the airtight chamber is kept at a pressure higher than an atmospheric pressure outside the robot.

Where such an internally pressurized explosive proof structure is adapted for a robot, when a pressure in the airtight chamber decreases and becomes less than an atmospheric pressure outside the robot due to a malfunction, a dangerous gas such as an inflammable gas or the like can enter the airtight chamber, and thus it is dangerous to continue operating the robot under such a malfunctioning condition.

DISCLOSURE OF THE INVENTION

According to the present invention, there is provided an industrial robot comprising: a robot assembly including a stationary robot component and a plurality of movable robot components, at least a part of the stationary robot component and the movable robot components having therein airtight chambers which communicate with each other and are intended to be kept at a pressure higher than a predetermined level which is higher than an external atmospheric pressure; robot driving motors arranged within the airtight chambers for driving the movable robot components; a driving motor controller connected to the robot driving motors by means of electric cables arranged within the airtight chambers for driving and controlling the driving motors; and means for detecting the pressure in the airtight chambers and transmitting signals to the driving motor controller to stop the robot driving motors when the pressure in the airtight chambers drops below the predetermined level.

According to the industrial robot provided by the present invention, it is possible to stop the robot driving motors arranged within the airtight chambers of the robot assembly when the pressure in the airtight chambers drops below a predetermined level. Consequently, the danger of a fire of explosion due to a leakage of an inflammable gas or the like into the airtight chambers is avoided.

The driving motors arranged within the airtight chambers may be either DC servomotors or AC servomotors. DC servomotors contain a source of ignition. Therefore, when DC servomotors are used, it is desirable to stop the motors immediately when the pressure in the airtight chamber drops below a predetermined level. Accordingly, in one embodiment of the present invention, the driving motor controller acts to electrically cut off the driving circuit of the driving motors from the power source when receiving the detecting signals from pressure switches.

AC servomotors do not contain an ignition source. Therefore, when AC servomotors are used, the respective rotational velocities thereof may be gradually reduced before they are stopped, in accordance with a predetermined program, when the pressure in the airtight chambers drops below a predetermined level and causes pressure switches to issue the detecting signals. The robot also may be stopped after one cycle of the operation thereof is completed.

The foregoing and other features and advantages of the present invention will be better understood from the ensuing detailed description with reference to the accompanying drawings.

BRIEF EXPLANATION OF THE DRAWINGS

FIG. 1 is a view showing a combined relationship between FIG. 1A and FIG. 1B;

FIGS. 1A and 1B show a left half side and right half side of the block diagram, respectively, of the main part of the electric circuit of the industrial robot according to a first embodiment of the present invention;

FIG. 4 is a view showing a combined relationship between FIG. 4A and FIG. 4B;

FIGS. 4A and 4B show a left half side and a right half side of the block diagram, respectively, of the main part of the electric circuit of the industrial robot according to a second embodiment of the present invention.

BEST MODE FOR CARRYING OUT THE INVENTION

Figure 2:
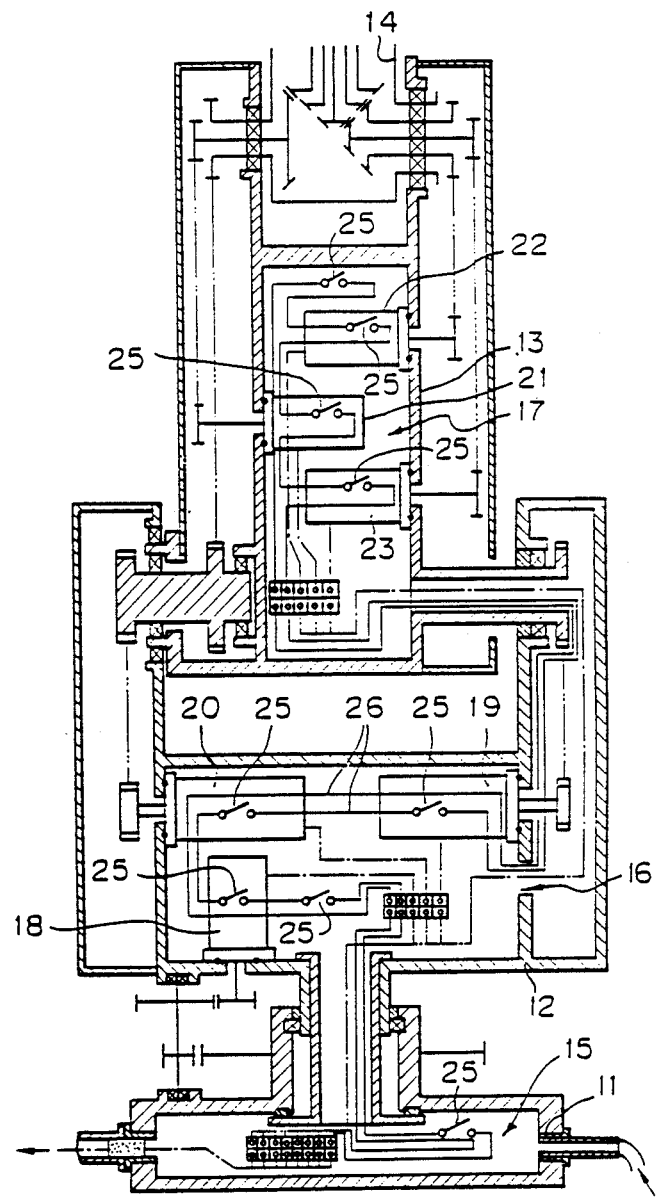
FIG. 2 is a cross section view schematically illustrating an internal structure of the main part of the industrial robot.

Referring to FIG. 2 which illustrates an internal structure of the main part of the industrial robot, the robot comprises a stationary base unit 11 as a stationary component thereof. The stationary base unit 11 is provided with a plurality of movable components interconnected to each other, one of which is connected to the stationary robot. In this embodiment, a swiveling body unit 12 is rotatably joined to the stationary base unit 11. An upper arm 13 is rotatably joined to the swiveling body unit 12. A lower arm 14 is rotatably joined to the tip end of the upper arm 13. A wrist unit, not shown, is attached to the tip end of the lower arm 14. A working attachment such as a robot hand or the like can be attached to the wrist unit. Airtight chambers 15, 16, and 17 are formed in the interior of the stationary base unit 11, the swiveling body unit 12, and the upper arm 13, respectively. These airtight chambers 15 to 17 communicate with each other and are kept airtight against the exterior atmosphere. Driving motors 18, 19, and 20 for rotationally driving the swiveling body unit 12, respectively, are disposed within the airtight chamber 16 of the swiveling body 12, and three driving motors 21, 22, and 23 for driving the three-axis wrist unit are disposed within the airtight chamber 17 of the upper arm 13. Airtight chambers, not shown, are formed within the driving motors 18 to 23, respectively. Power supply cables for supplying an electric power to the driving motors 18 to 23, respectively, and signal transmitting cables are disposed within the corresponding airtight chambers 15 to 17. These cables are connected to a driving motor controller through a fixed pipe 11a attached to the stationary base unit 11.

The airtight chambers 15 to 17 of the robot and the airtight chambers formed in the driving motors 18 to 23 are normally kept at a pressure higher than an external atmospheric pressure to prevent the leakage of a dangerous gas, such as an inflammable gas or the like, into the airtight chambers. The airtight chambers 15 to 17 are, in this embodiment, connected to a pressurized air supply source by means of an air pipe 24. The airtight chambers 15 to 17 may be sealed against the exterior atmosphere.

Pressure switches 25 are disposed within the chambers of the driving motors 18 to 23, respectively. These pressure switches 25 are preferably interconnected in series by means of lead wires 26.

Figure 1B:
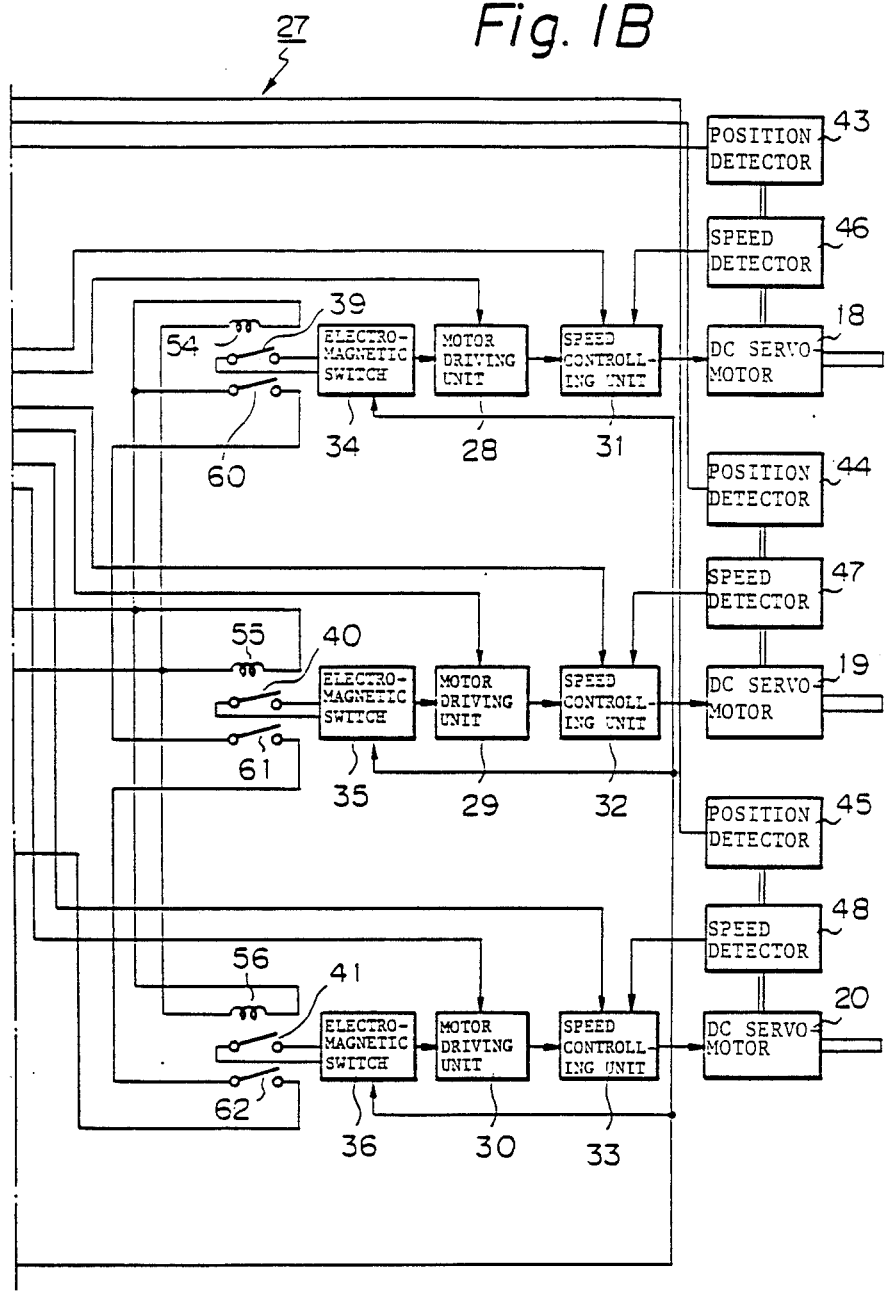

FIGS. 1A and 1B show a left half and a right half sides of the electric circuit block diagram, respectively, for schematically illustrating the connection of the driving motor controller of the robot and the switches 25. To simplify the description, only three driving motors 18 to 20 among the above-mentioned six driving motors 18 to 23 are shown in FIGS. 1A and 1B and the rest of the driving motors are omitted. The driving motors 18 to 20 are, in this embodiment, DC servomotors. The driving motor controller generally denoted by reference numeral 27 comprises motor driving units 28 to 30 for driving the motors 18 to 20, respectively and speed controlling units 31 to 33 for controlling the rotational velocity of the output shafts of the motors 18 to 20, respectively. The motor driving units 28 to 30 are connected through electromagnetic switches 34 to 36, respectively, to a servotransformer 37 which is connected to a three-phase AC power source 38. Each of the motor driving units 28 to 30 transforms a three-phase AC voltage into a DC voltage. The electromagnetic switches 39 to 41 control the power supply to the motor driving units 28 to 30 from the power source 38 in accordance with the ON-OFF operation of operating switches 39 to 41.

The driving motor controller 27 has a main control unit 42. Position detectors 43 to 45 for detecting the rotation angle or phase of the respective output shafts of the motors 18 to 20, transmit detecting signals to the main control unit 42, respectively. The main control unit 42 transmits a normal rotation command signal, a reverse rotation command signal, or a stop command signal to the motor driving units 28 to 30 in accordance with a predetermined control program, in response to the detection signals given thereto from the position detectors 43 to 45, and also transmits a speed command signal to the speed controlling units 31 to 33. Speed detectors 46 to 48 for detecting the rotational velocity of the respective output shafts of the motors 18 to 20 transmit detecting signals to the speed controlling units 31 to 33, respectively, and the speed controlling units 31 to 33 control the level of the DC current to be supplied to the motors 18 to 20 from the motor driving units 28 to 30 on the basis of the speed command signals given thereto by the main control unit 42 and the speed detection signals given thereto by the speed detectors, respectively, to control the respective rotational velocity of the motors 18 to 20.

The power source 38 is connected through an input unit 49 having a power switch 50 to a power unit 51. The power unit 51 supplies an operating voltage to the main control unit 42 when the power switch 50 is closed. A voltage comparator 52, namely, a voltage detector, detects whether the operating voltage supplied to the main control unit 42 from the power unit 51 has reached a reference voltage, for example, +5V DC, and provides an output signal VSB having a level 1 when the operating voltage coincides with the reference voltage. An operating unit 53 is provided with coils 54 to 56 for controlling the operating switches 39 to 41, respectively. The series connection of the coils 54 to 56 is connected at one end thereof to the output terminal of the power unit 51, and the other end thereof is grounded through a driver 57. The driver 57 is connected to the output terminal of a NAND gate 58. The driver 57 connects the coils 54 to 56 to the earth when the output level of the NAND gate 58 is 0 (zero) and disconnects the same from the earth when the output level of the NAND gate 58 is 1 (one). The output terminal of the voltage comparator 52 is connected to an input terminal of the NAND gate 56. An operation detecting circuit 59 has switches 60, 61, and 62 which are closed when the coils 54 to 56 are energized, respectively. One terminal of the series connection of the switches 60 to 62 is connected to the power unit 51, and the other terminal thereof is connected to the main controlling unit 42 through a receiver 63. When the switches 60 to 62 are closed, a predetermined DC voltage, for example, +24V DC, is applied to the receiver 63, and the receiver then supplies an output signal VRDY to the main control unit 42.

One terminal of the series connection of the pressure switches 25 is connected to the power unit 51, and the other terminal thereof is connected to an input terminal of the NAND gate 58 through a receiver 64. The pressure switches 25 are closed while the pressure in the airtight chamber of the robot is higher than a predetermined level which is higher than an atmospheric pressure outside the robot, and are opened when the pressure in the airtight chamber drops below the predetermined level. While all the pressure switches 25 are closed, the receiver 64 supplies an output signal APR having a level 1 to the NAND gate 58. When any one of the pressure switches 25 is opened, the receiver 64 provides an output signal APR of level 0.

Figure 3:
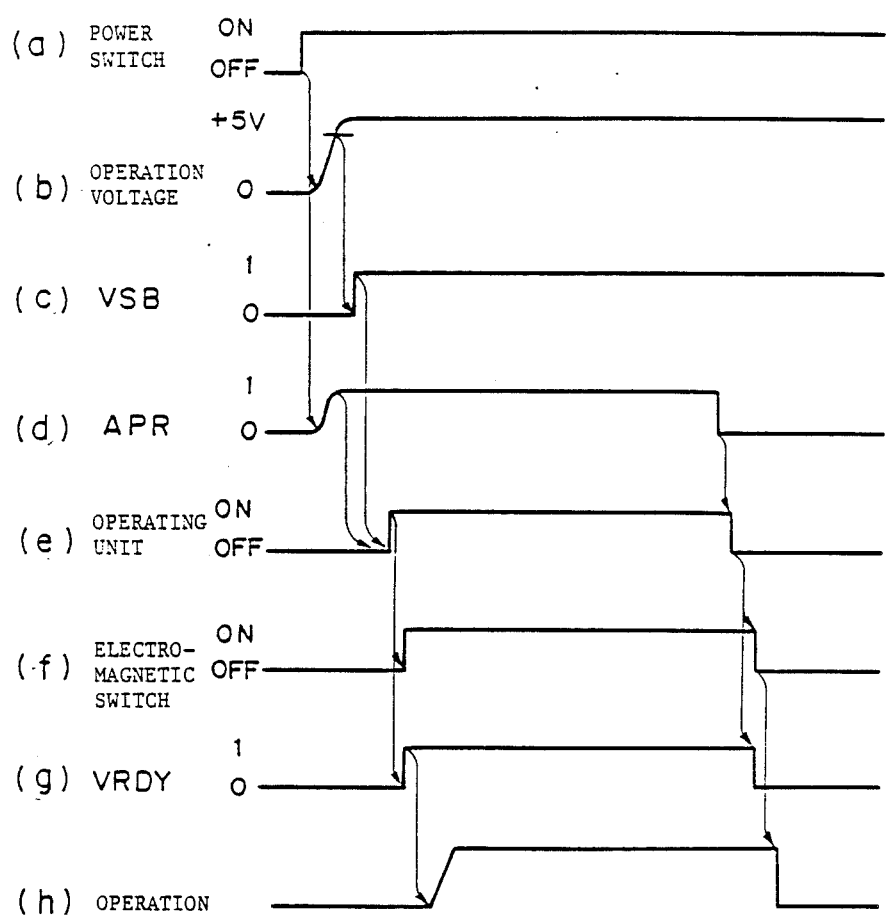
FIGS. 3a–h is a time chart illustrating the operation of the circuit shown in FIGS. 1A and 1B.

FIG. 3 shows the mode of action of the driving motor controller and the safety device. Referring to FIG. 3, when the power switch 50 is closed, namely, in the ON-position (FIG. 3 (a)), the operating voltage applied to the main controller 42 by the power unit 51 rises from the level 0 (FIG. 3 (b)). Upon the arrival of the operating voltage at the reference voltage (+5V DC), the voltage comparator 52 supplies an output signal VSB having a level 1 to the input terminal of the NAND gate 58 (FIG. 3 (c)). On the other hand, since all the pressure switches 25 are closed while the pressure in the airtight chamber of the robot is kept at a level higher than the predetermined level, the receiver 64 supplies an output signal APR having a level 1 to the NAND gate 58 (FIG. 3 (d)). Accordingly, the NAND gate 58 provides an output signal having a level 0, so that the operating unit 53 is actuated (FIG. 3 (e)). That is, when a NAND gate 58 supplies an output signal having a level 0 to the driver 57, the driver 57 connects the coils 54 to 56 to the earth, and thereby the coils 54 to 56 are energized.

Upon the energization of the coils 54 to 56 of the operating unit 53, the operating switches 39 to 41 of the electromagnetic switches 34 to 36 are closed, respectively, and hence the respective electromagnetic switches 34 to 36 are closed, namely, in ON-positions (FIG. 3 (f)). At the same time, upon the energization of the coils 54 to 56 of the operating unit 53, the switches 60 to 62 of the operation detecting circuit 59 are closed, and hence an output signal VRDY from the receiver 63 is supplied to the main control unit 42 (FIG. 3 (g)). Upon reception of the output signal VRDY, the main control unit 42 supplies predetermined command signals to the motor driving units 28 to 30 and the speed controllers 31 to 33, respectively, in accordance with the control program (FIG. 3 (h)).

When the pressure in the airtight chambers drops below the predetermined level during the operation of the robot, a pressure switch 25 or some other is opened, and hence an output signal APR having level 0 is supplied to the NAND gate 58 from the receiver 64 (FIG. 3 (d)). Accordingly, the output level of the NAND gate 58 is changed to 0, and thereby the coils 54 to 56 of the operating unit 53 are disconnected from the earth by means of the driver 57 and are energized. That is, the operating unit 53 is changed to an OFF-state (FIG. 3 (e)). Thus, the electromagnetic switches 34 to 36 are changed to the OFF-state, and thereby the supply of electric power to the motor driving units 28 to 30 from the power source is immediately interrupted, and hence the driving motors 18 to 20 stop.

Since the DC servomotor contains an ignition sources, it is desirable to interrupt the supply of electric power to the motor driving units 28 to 30 from the power source instantaneously at the moment the pressure in the airtight chamber of the robot has dropped below the predetermined level. Since the supply of electric power to the motor driving units 28 to 30 is, in this embodiment, interrupted immediately after the pressure in the airtight chambers of the robot has dropped below the predetermined level, this embodiment is suitable for a robot employing DC servomotors as the robot driving motors.

Figure 4B:
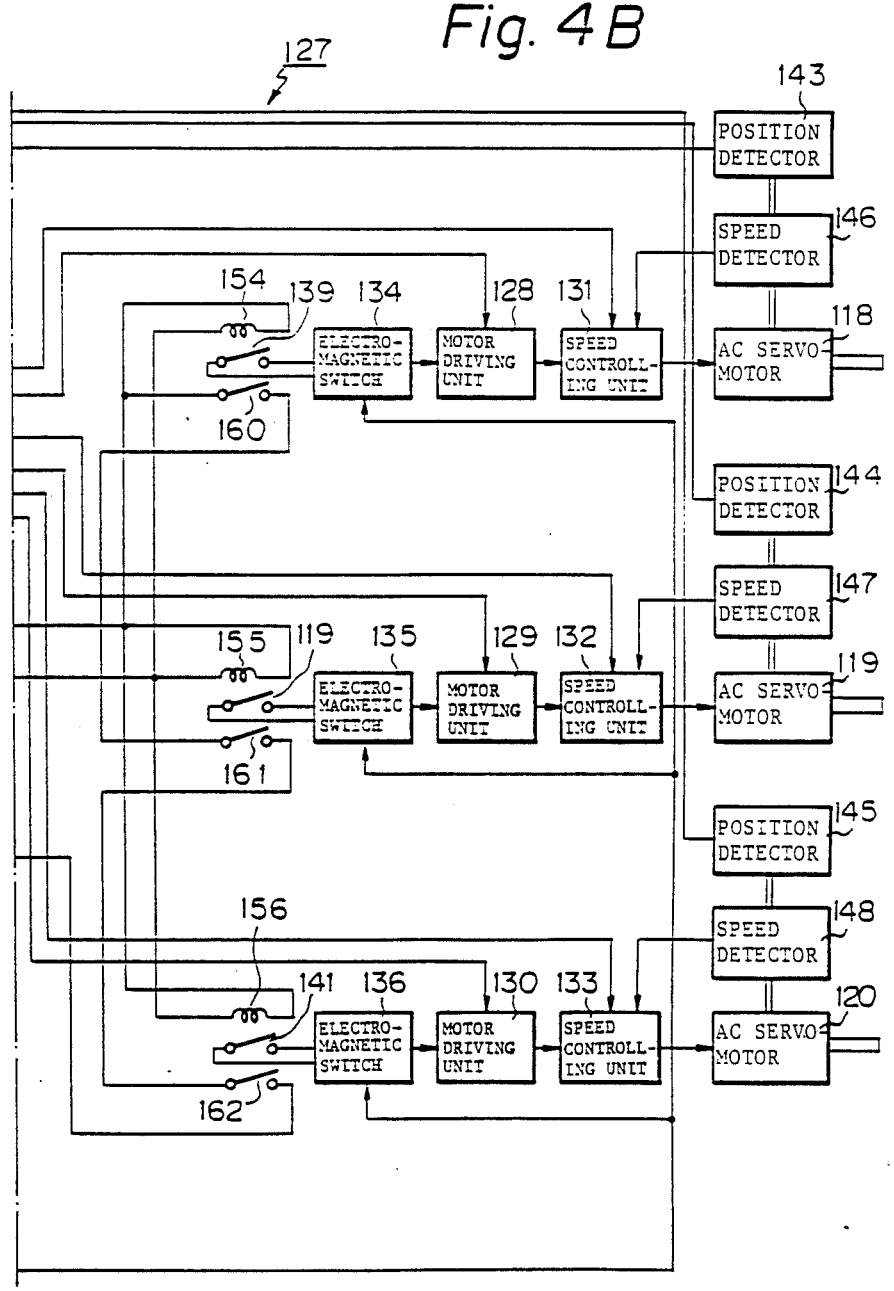

FIGS. 4A and 4B show a left half side and a right half side of the block diagram, respectively, of the main part of the electric circuit of the industrial robot according to a second embodiment of the present invention. In FIGS. 4A and 4B, components similar or corresponding to those of the above-described embodiment are denoted by reference numerals which are higher than the reference numerals of the similar or corresponding components of the above-described embodiment by one hundred, respectively.

Referring to FIGS. 4A and 4B, the driver 157 of an operating unit 153 is connected to an output terminal of a voltage comparator 152, and the output terminal of a receiver 164 is connected to an input terminal of the main control unit 142. Robot driving motors 118 to 120 are AC servomotors. Motor driving units 128 to 130 are adapted to apply a three-phase AC voltage to the driving motors 118 to 120 through speed controlling units 131 to 133, respectively. The motor driving units 128 to 130 act to change the rotational direction of and to stop the driving motors 118 to 120, respectively, in response to a signal given by the main control unit 142. Only the three robot driving motors 118 to 120 are shown in FIGS. 4A and 4B, the rest of the robot driving motors are omitted to simplify the description.

Figure 5:
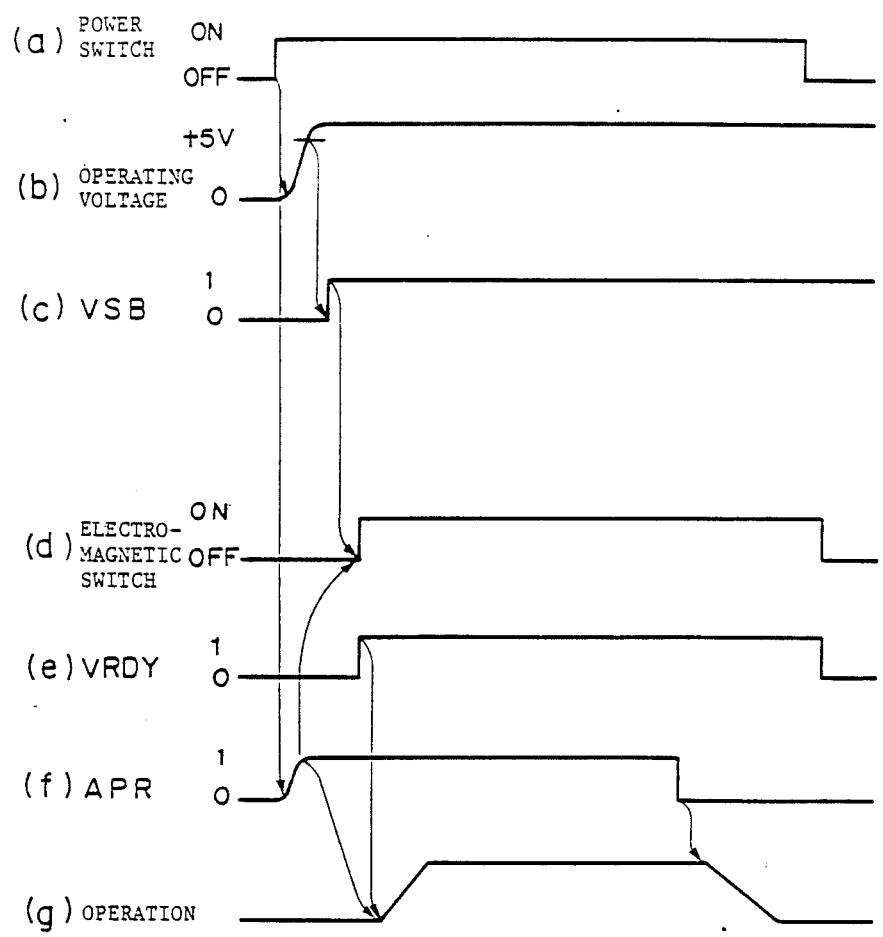
FIGS. 5a–g is a time chart illustrating the operation of the circuit shown in FIGS. 4A and 4B.

FIG. 5 shows the mode of operation of the second embodiment. Referring to FIGS. 4A, 4B and 5, upon the closure of a power switch 150 (FIG. 5 (a)), the operating voltage supplied to the main controller 142 rises to a reference voltage (FIG. 5 (b)), and thereby an output signal VSB of level 1 is given to the driver 157 of the operating unit 13 from the voltage comparator 152 (FIG. 5 (c)) to actuate the operating unit 153. Thus, electromagnetic switches 134 to 136 are changed to an ON-state (FIG. 5 (d)) and the switches 160 to 163 of an operation detecting circuit 159 are closed. Consequently, an output signal VRDY having a level 1 is supplied to the main control unit 142 from the receiver 163 (FIG. 5 (d)). On the other hand, while the pressure in the airtight chambers is higher than the predetermined level, the pressure switches 15 are in closed state, and hence the receiver 164 continues to supply an output signal APR having a level 1 to the main control unit 142 (FIG. 5 (f)). Upon reception of the output signals from the receivers 163 and 164, the main control unit 142 supplies control command signals to the motor driving units 128 to 130 and the speed controlling units 131 to 133 in accordance with a control program (FIG. 5 (g)).

When the pressure in the airtight chamber drops below the predetermined level during operation of the robot, a pressure switch 25 or some other opens, and thereby the level of the output signal APR supplied by the receiver 164 to the main control unit 142 changes to level 0 (FIG. 5 (f)). The main control unit 142 acts to stop the robot in accordance with a control program in response to such a change of the level of the output signal APR. Since the AC servomotors 118 to 120 do not contain an ignition source, an emergency does not immediately result from the drop of pressure in the airtight chamber. Accordingly, the rotational speed of the driving motors may be reduced gradually in accordance with a control program before the driving motors are stopped, or the robot may be stopped after one cycle of the operation of the robot is finished.

Although the invention has been described hereinbefore with reference to two embodiments, the present invention is not limited thereto and various changes in the components are possible without departing from the scope of the present invention as described in the claims mentioned later. For example, the speed control units and the motor driving units may be integrated as a single unit; the motor driving motors illustrated in FIG. 2 may be AC servomotors; and the driving motors for driving the wrist unit may be arranged within the forearm.

CAPABILITY OF EXPLOITATION IN INDUSTRY

The present invention can be applied to various industrial robots used in an inflammable or explosive environments for assembling operations or the like.

We claim:

1. An industrial robot for use in an atmosphere containing an inflammable or explosive gas, comprising:
    a robot assembly including a stationary robot component and a plurality of movable robot components, at least a part of said stationary robot component and said movable robot components having therein airtight chambers which communicate with each other;

means for supplying pressurized air to said airtight chambers to maintain the interior of said airtight chambers at a pressure higher than a predetermined pressure level, which is higher than that of the external atmosphere to prevent seepage of said inflammable or explosive gas into said airtight chambers;

electric motors for driving and moving said movable robot components, said motors disposed within said airtight chambers;

a programmable controller for supplying electric power to said motors and for controlling said motors in accordance with a predetermined program, said controller disposed outside of said atmosphere of inflammable or explosive gas and electrically connected to said motors through electric cables arranged in said airtight chambers and hermetically sealed conduit connected to said stationary robot component; and;

a plurality of pressure switches, arranged in said airtight chambers and electrically connected to said controller, for detecting a pressure in said airtight chambers and transmitting a motor-stop signal to said controller when the pressure in said airtight chambers drops below said predetermined level, such that, in response to said motor-stop signal from said pressure switches, said controller stops the supply of electric power to said motors.

2. An industrial robot according to claim 1, wherein said controller immediately stops the supply of electric power to said motors upon the reception of said motor-stop signal from said pressure switches.

3. An industrial robot according to claim 2, wherein said controller comprises:

electromagnetic switches for controlling the supply of electric power to said motors, each electromagnetic switch corresponding to one of said motors, wherein each electromagnetic switch has an open position at which each electromagnetic switch stops the supply of electric power to its corresponding motor, and a closed position at which each electromagnetic switch conducts the supply of electric power to its corresponding motor; and an operating unit for actuating said electromagnetic switches, said operating unit being operatively connected to said pressure switches and said electromagnetic switches, such that said operating unit operates said electromagnetic switches to immediately open when said operating unit receives said motor-stop signal from said pressure switches.

4. An industrial robot according to claim 2 or 3, wherein said motors are DC servomotors.

5. An industrial robot according to claim 1, wherein, upon receiving said motor-stop signal from said pressure switches, said controller gradually reduces a rotational speed of said motors and then stops the supply of electric power to said motors.

6. An industrial robot according to claim 5, wherein said motors are AC servomotors.

* * * * *